United States Patent
Verhoff et al.

(10) Patent No.: US 10,774,535 B2
(45) Date of Patent: Sep. 15, 2020

(54) ASPHALT SHINGLES WITH A FIRE-RETARDANT ADDITIVE

(71) Applicant: Owens Corning Intellectual Capital, LLC, Toledo, OH (US)

(72) Inventors: Jonathan Michael Verhoff, Granville, OH (US); Barry Michael Lewis, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 15/806,377

(22) Filed: Nov. 8, 2017

(65) Prior Publication Data

US 2018/0135302 A1    May 17, 2018

Related U.S. Application Data

(60) Provisional application No. 62/421,471, filed on Nov. 14, 2016.

(51) Int. Cl.
*E04D 1/00* (2006.01)
*E04D 1/22* (2006.01)
(Continued)

(52) U.S. Cl.
CPC .................. *E04D 1/22* (2013.01); *B32B 7/12* (2013.01); *B32B 11/04* (2013.01); *E04D 1/20* (2013.01);
(Continued)

(58) Field of Classification Search
CPC ....... B32B 7/12; B32B 11/04; B32B 2395/06; B32B 2419/06; C09J 11/04; E04D 1/22; E04D 2001/005
(Continued)

(56) References Cited

U.S. PATENT DOCUMENTS 1,398,991 A * 12/1921 Young ...................... C08K 5/03
                                                  106/18.23
3,180,783 A * 4/1965 Walker ..................... C08L 95/00
                                                  156/71
(Continued)

FOREIGN PATENT DOCUMENTS

EP         0135261         9/1987
EP         0301176         2/1994
(Continued)

OTHER PUBLICATIONS

Grober, "Roofing granules," Bachelors Thesis Paper, 1936, 23 pages.
(Continued)

*Primary Examiner* — Joshua J Michener
*Assistant Examiner* — James J Buckle, Jr.
(74) *Attorney, Agent, or Firm* — Calfee, Halter & Griswold LLP (57) ABSTRACT

A roofing shingle having a fire-retardant material added to the shingle in specific locations is provided. In one aspect a roofing system with two or more asphalt-coated substrates and a sealant material provided between the substrates is provided. The sealant material adheres an overlying and underlying shingle together and can contain a fire-retardant material. In a second aspect of the present invention, a multi-layer laminated shingle is provided with an adhesive material between one or more asphalt-coated substrates which adheres the asphalt-coated substrates together and can contain a fire-retardant material.

18 Claims, 8 Drawing Sheets

(51) Int. Cl.
*E04D 1/36* (2006.01)
*E04D 1/26* (2006.01)
*E04D 1/20* (2006.01)
*E04D 1/28* (2006.01)
*B32B 7/12* (2006.01)
*B32B 11/04* (2006.01)
*C09J 11/04* (2006.01)

(52) U.S. Cl.
CPC .............. *E04D 1/26* (2013.01); *E04D 1/28* (2013.01); *E04D 1/36* (2013.01); *B32B 2307/3065* (2013.01); *B32B 2395/00* (2013.01); *B32B 2419/06* (2013.01); *C09J 11/04* (2013.01); *E04D 2001/005* (2013.01)

(58) Field of Classification Search
USPC .......................................................... 52/518
See application file for complete search history.

(56) References Cited

U.S. PATENT DOCUMENTS

| | | | |
|---|---|---|---|
| 3,365,322 A * | 1/1968 | Hinds | E04D 1/26 428/145 |
| 4,218,502 A | 8/1980 | Graham et al. | |
| 4,234,639 A | 11/1980 | Graham | |
| 4,317,853 A * | 3/1982 | Thiis-Evensen | E04D 1/26 428/80 |
| 4,372,997 A | 2/1983 | Fritze et al. | |
| 4,521,333 A | 6/1985 | Graham et al. | |
| 5,100,715 A | 3/1992 | Zimmerman et al. | |
| 5,160,788 A * | 11/1992 | Feinberg | C08K 3/22 428/344 |
| 5,258,216 A | 11/1993 | Von Bonin et al. | |
| 5,326,797 A | 7/1994 | Zimmerman et al. | |
| 5,437,923 A | 8/1995 | Kalkanoglu | |
| 5,516,817 A | 5/1996 | Slusher et al. | |
| 5,615,523 A | 4/1997 | Wells et al. | |
| 5,657,603 A | 8/1997 | Goodhart et al. | |
| 5,840,413 A | 11/1998 | Kajander | |
| 5,851,663 A * | 12/1998 | Parsons | C08K 5/0066 428/356 |
| 5,965,257 A | 10/1999 | Younger | |
| 6,194,519 B1 | 2/2001 | Blalock et al. | |
| 6,235,347 B1 | 5/2001 | Arshinova et al. | |
| 6,352,786 B2 | 3/2002 | Arshinova et al. | |
| 6,436,510 B1 | 8/2002 | Heidel et al. | |
| 6,610,147 B2 | 8/2003 | Aschenbeck | |
| 6,635,140 B2 | 10/2003 | Phillips et al. | |
| 6,894,099 B2 | 5/2005 | Moore | |
| 6,983,571 B2 | 1/2006 | Felton | |
| 6,990,779 B2 | 1/2006 | Kiik et al. | |
| 7,272,915 B2 | 9/2007 | Peng | |
| 7,582,155 B2 | 9/2009 | Mehta et al. | |
| 7,641,964 B2 | 1/2010 | Swei et al. | |
| 7,765,763 B2 * | 8/2010 | Teng | E04D 1/26 52/413 |
| 7,805,909 B2 | 10/2010 | Teng et al. | |
| 7,828,995 B2 | 11/2010 | Kruse et al. | |
| 7,857,904 B2 | 12/2010 | Trumbore et al. | |
| 8,066,807 B2 | 11/2011 | Adams | |
| 8,178,449 B2 | 5/2012 | La Vietes et al. | |
| 8,240,102 B2 | 8/2012 | Belt et al. | |
| 8,277,881 B2 | 10/2012 | Khan et al. | |
| 8,530,034 B2 | 9/2013 | Khan et al. | |
| 8,793,955 B2 * | 8/2014 | Ray | E04D 1/26 428/126 |
| 8,802,215 B2 | 8/2014 | Kalkanoglu et al. | |
| 9,140,012 B1 * | 9/2015 | Leitch | E04D 1/26 |
| 9,242,432 B1 * | 1/2016 | Harrington, Jr. | B32B 11/00 |
| 9,464,439 B2 * | 10/2016 | Buzza | E04D 1/12 |
| 9,574,350 B2 * | 2/2017 | Loftus | C09J 195/00 |
| 9,605,433 B2 * | 3/2017 | Paradis | E04D 1/28 |
| 9,725,907 B2 | 8/2017 | Harrington et al. | |
| 9,739,062 B2 * | 8/2017 | Leitch | E04D 1/26 |
| 2003/0040241 A1 | 2/2003 | Kiik et al. | |
| 2005/0145139 A1 | 7/2005 | Khan et al. | |
| 2005/0215153 A1 | 9/2005 | Cossement et al. | |
| 2006/0199453 A1 | 9/2006 | Kuhn et al. | |
| 2006/0240224 A1 | 10/2006 | Khan et al. | |
| 2007/0166454 A1 | 7/2007 | Gupta | |
| 2008/0086970 A1 | 4/2008 | Teng et al. | |
| 2008/0102243 A1 | 5/2008 | Gupta | |
| 2008/0131664 A1 * | 6/2008 | Teng | B22F 1/0059 428/144 |
| 2008/0188590 A1 | 8/2008 | Gupta | |
| 2009/0104425 A1 | 4/2009 | Nandi et al. | |
| 2009/0229210 A1 * | 9/2009 | Binkley | B29C 65/56 52/543 |
| 2010/0037548 A1 * | 2/2010 | Kalkanoglu | B29C 47/046 52/309.1 |
| 2010/0087115 A1 | 4/2010 | Davis et al. | |
| 2010/0167013 A1 | 7/2010 | Cruz et al. | |
| 2011/0011021 A1 | 1/2011 | LaVietes et al. | |
| 2011/0118371 A1 | 5/2011 | Staal et al. | |
| 2011/0232220 A1 | 9/2011 | Belt et al. | |
| 2012/0180948 A1 * | 7/2012 | Aschenbeck | B05D 1/30 156/269 |
| 2012/0183684 A1 | 7/2012 | Aschenbeck | |
| 2012/0183685 A1 | 7/2012 | Aschenbeck | |
| 2013/0025225 A1 | 1/2013 | Vermilion et al. | |
| 2013/0078460 A1 | 3/2013 | Tasaka et al. | |
| 2014/0130435 A1 | 5/2014 | Paradis et al. | |
| 2014/0273682 A1 | 9/2014 | Xing et al. | |
| 2015/0218823 A1 | 8/2015 | Shiao et al. | |

FOREIGN PATENT DOCUMENTS

| | | |
|---|---|---|
| EP | 2532515 | 12/2012 |
| WO | 2015013176 | 1/2015 |
| WO | 2015157278 | 10/2015 |
| WO | 2016008115 | 1/2016 |

OTHER PUBLICATIONS

GrafTech International, "Grafguard Flame Retardant Additive Technical Data Sheet 226," May 16, 2014.

Shen et al., "Recent Advances in the Use of Zinc Borates As Multifunctional Fire Retardants in Halogen-Free Polymers," Polymeric Materials: Science & Engineering (2004), vol. 91, pp. 162-163.

* cited by examiner

ASPHALT SHINGLES WITH A FIRE-RETARDANT ADDITIVE

RELATED APPLICATIONS

This application claims priority to and the benefit of U.S. Provisional Application No. 62/421,471, filed on Nov. 14, 2016, the content of which is hereby incorporated by reference in its entirety as if recited herein.

BACKGROUND

Asphalt-based roofing materials, such as roofing shingles, roll roofing, and commercial roofing, are installed on the roofs of buildings to provide protection from the elements and to give the roof an aesthetically pleasing look. Typically, the roofing material is constructed of a substrate, such as a glass fiber mat or an organic felt, an asphalt coating on the substrate, and a protective and/or decorative surface layer of granules of stone, mineral, sand, or other particulate material embedded in the tacky asphalt coating.

Roofing materials are expected to perform and maintain their appearance over time and in various environmental conditions. The American Society of Testing Materials (ASTM) and Underwriters Laboratories (UL) have developed specifications, testing, and ratings for various properties of roof shingles, such as fire resistance, impact resistance, and wind resistance. Shingle manufacturers desire to provide roofing materials that meet or exceed the various standards, such as the ASTM E108 (UL 790), class A rating for fire resistance. ASTM E108 is a fire-test response standard that is used to evaluate roof coverings in both residential and commercial roofing application and covers materials that are used on combustible or noncombustible roof deckings. Class A fire performance under ASTM E108 requires passage of a "burning brand test," which is meant to simulate a burning tree branch landing on a typical roof.

SUMMARY OF THE INVENTION

According to some exemplary embodiments, a roofing system is provided. The roofing system includes a roof deck with two or more asphalt-coated substrates on the roof deck. A first of the asphalt-coated substrates overlies a second of the asphalt-coated substrates. A sealant material binds the overlaid asphalt-coated substrates together. The sealant material includes one or more fire-retardant materials.

According to some exemplary embodiments, a laminated roofing shingle is provided comprising a first asphalt-coated substrate and a second asphalt-coated substrate laminated on to the first asphalt-coated substrate. The first and second asphalt-coated substrates are held together by an adhesive material which contains one or more fire-retardant materials.

DETAILED DESCRIPTION OF THE INVENTION

The embodiments disclosed herein will now be described by reference to some more detailed embodiments, in view of the accompanying drawings. These embodiments may, however, be embodied in different foams and should not be construed as limited to the embodiments set forth herein. Rather, these embodiments are provided so that this disclosure will be thorough and complete, and will fully convey the scope of the inventions to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. Every numerical range given throughout this specification and claims will include every narrower numerical range that falls within such broader numerical range, as if such narrower numerical ranges were all expressly written herein.

The term about "about" means within ±10% of a value, or more preferably, within ±5% of a value, and most preferably within ±1% of a value.

As used in the description and the appended claims, the phrase "asphalt" is defined as any type of bituminous material suitable for use on a roofing material, such as asphalts, tars, pitches, or mixtures thereof. The asphalt may be either manufactured asphalt produced by refining petroleum or naturally occurring asphalt. The asphalt can be oxidized or non-oxidized. The asphalt may include any number of various additives and/or modifiers, such as inorganic fillers or mineral stabilizers, organic materials such as polymers, recycled streams, and/or ground tire rubber. Preferably, the asphalt contains asphalt and an inorganic filler or mineral stabilizer.

As used in the description of the invention and the appended claims, the term "longitudinal" or "longitudinally" is defined as substantially parallel with the machine direction. The terms "top" and "bottom", when used regarding the roofing material, are in reference to the roofing material when installed on a roof "Bottom" referring to the portion facing towards the roof deck and "top" referring to the portion facing away from the roof deck.

It will be understood that when an element such as a layer, region, area, or panel is referred to as being "on" another element, it can be directly on the other element or intervening elements may be present. If an element or layer is described as being "adjacent to" or "against" another element or layer, it is to be appreciated that the element or layer may be directly adjacent to or directly against that other element or layer, or intervening elements may be present. It will also be understood that when an element such as a layer or element is referred to as being "over" another element, it can be directly over the other element, or intervening elements may be present.

Figure 1:
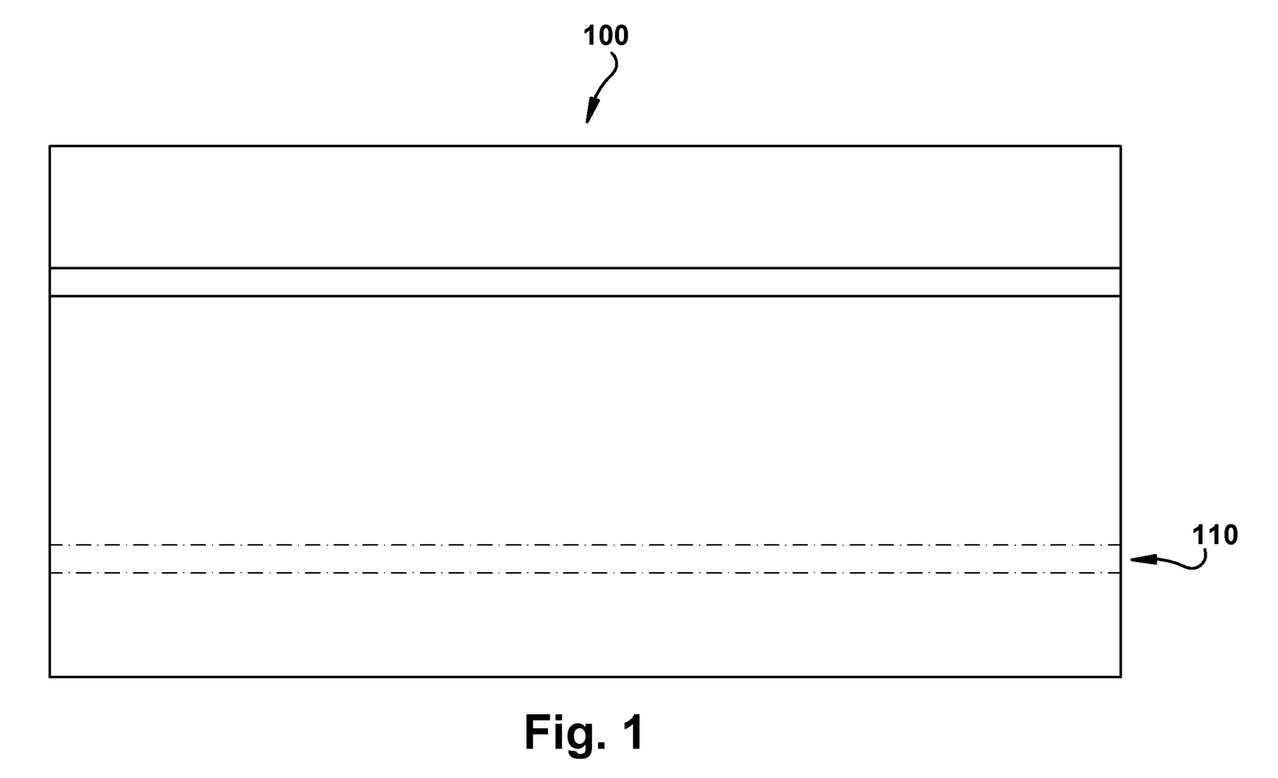
FIG. 1 is a top view of an exemplary embodiment of a roofing shingle with sealant material.

In a first aspect of the invention, a roofing system is provided. The roofing system comprises a roof deck with one or more asphalt-coated substrates on the roof deck. Between the asphalt-coated substrates is disposed a sealant material. The sealant material comprises one or more fire-retardant materials. FIG. 1 depicts an exemplary shingle 100 with sealant material 110 having a fire retardant material.

The roof deck can be any type of roof deck on any type of building. The roof deck can be sloped or horizontal. If sloped, the roof deck can be at any suitable angle. The roof deck can be made of any type of material that is common in the roofing industry, such as wood, metal, plastic, and the like. The roof deck can also be a part of any type of structure or building. In some exemplary embodiments, the roof deck is the top of a residential house. The roof deck, however, can be of any type of building.

The asphalt-coated substrate can be any asphalt-coated substrate used in the roofing industry. While the term shingle will be used herein to describe the asphalt-coated substrate, it is to be appreciated that the roofing systems described herein are not limited to shingles. Any asphalt-based substrate used in the roofing industry is within the purview of the present invention. Asphalt shingles are one of the most commonly used roofing products. These asphalt shingles typically incorporate a base material made from a fiberglass mat, or other suitable reinforcement member, such as an organic felt material. This reinforcing base material serves as a matrix to support an asphalt coating and gives the shingle strength. The asphalt coating is formulated for the particular application and has long-term ability to resist weathering and provide stability for the structure under extreme temperature conditions. An outer layer of granules can be applied to the asphalt coating to form an outer surface that protects the asphalt coating from direct sunlight. Different color granules can also be used to proved a variety in the surface appearance of the shingle.

Figure 2:
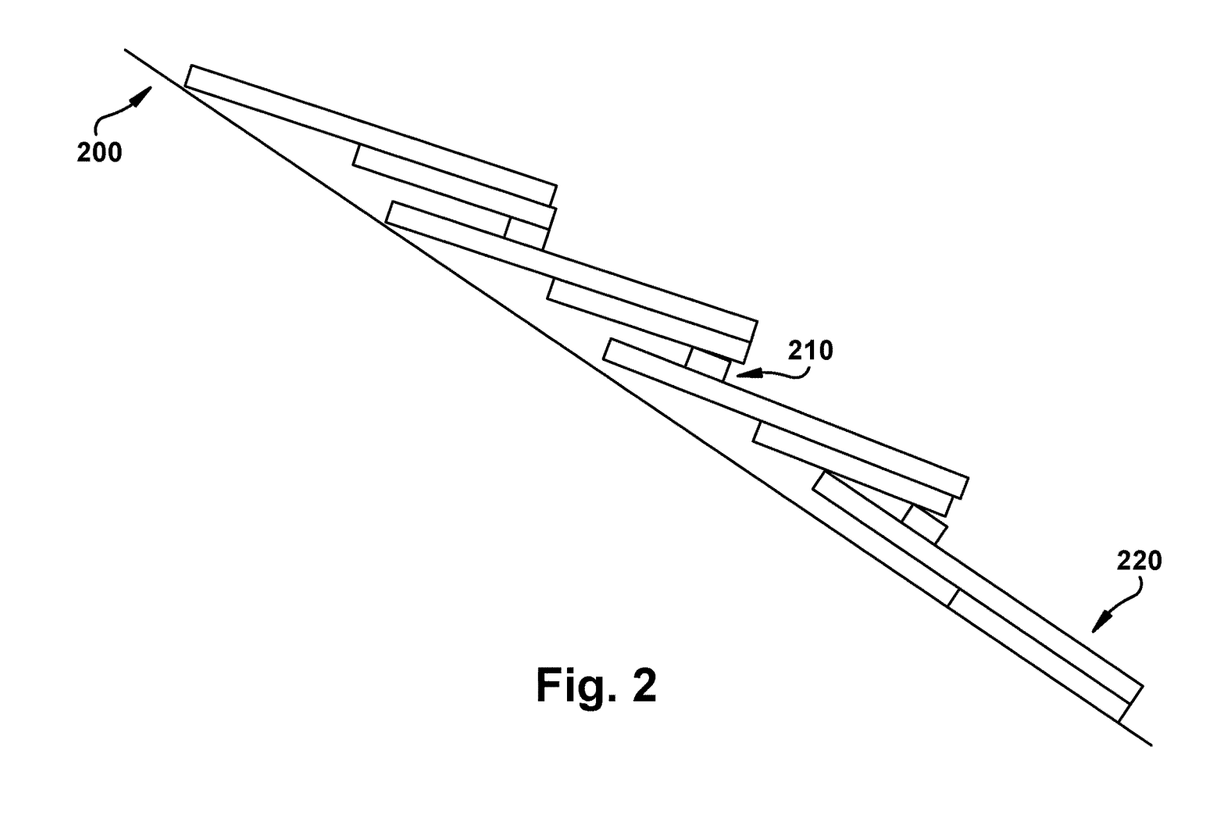
FIG. 2 is a cross-sectional view of an exemplary roofing system depicting a roof deck with laminated, multi-layer shingles.

In some exemplary embodiments, the shingles on the roof deck are single layer shingles and in other exemplary embodiments are laminated shingles. FIG. 2 shows an exemplary roofing system with laminated, multi-layer shingles 220 positioned on a roof deck 200. Disposed between the shingles 220 is a sealant material 210 that adheres each pair of overlying/underlying shingles together.

Figure 3:
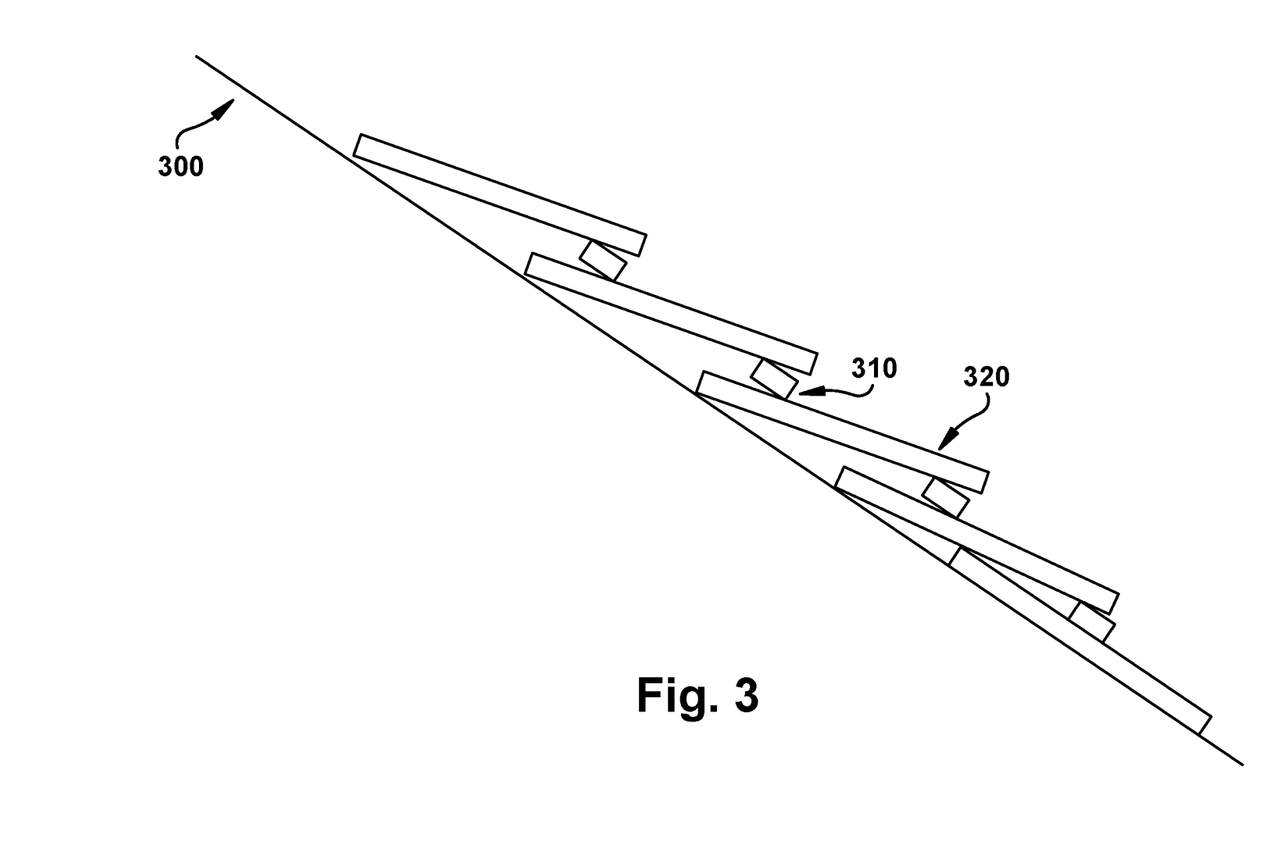
FIG. 3 is a cross-sectional view of an exemplary roofing system depicting a roof deck with single layer shingles.

FIG. 3 shows an exemplary roofing system with single layer shingles 320 positioned on a roof deck 300. Disposed between the shingles 320 is a sealant material 310 that adheres each pair of overlying and underlying shingles together.

The sealant in FIGS. 2 and 3 described above can be disposed at any location where two shingles meet, overlap, or otherwise touch. The sealant can be disposed in any shape or formation. In one exemplary embodiment, the sealant is a continuous line of sealant material and in other exemplary embodiments is a dashed/dis-continuous line of sealant material. In still other exemplary embodiments, the sealant is disposed as dots or beads. In still other exemplary embodiments, the sealant can be applied as a sheet across the entire portion where the shingles overlap. The sealant can be disposed in any number of lines, dots, beads, etc. In some exemplary embodiments, the roofing system includes at least one or at least two lines of sealant between each shingle.

Figure 4A:
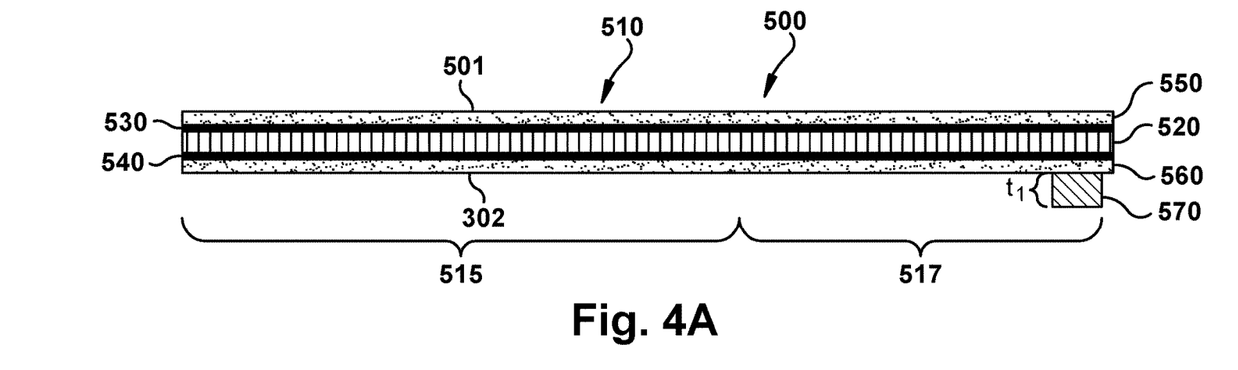
FIG. 4A is a cross-sectional side view of an exemplary embodiment of a single layer shingle.
Figure 4B:
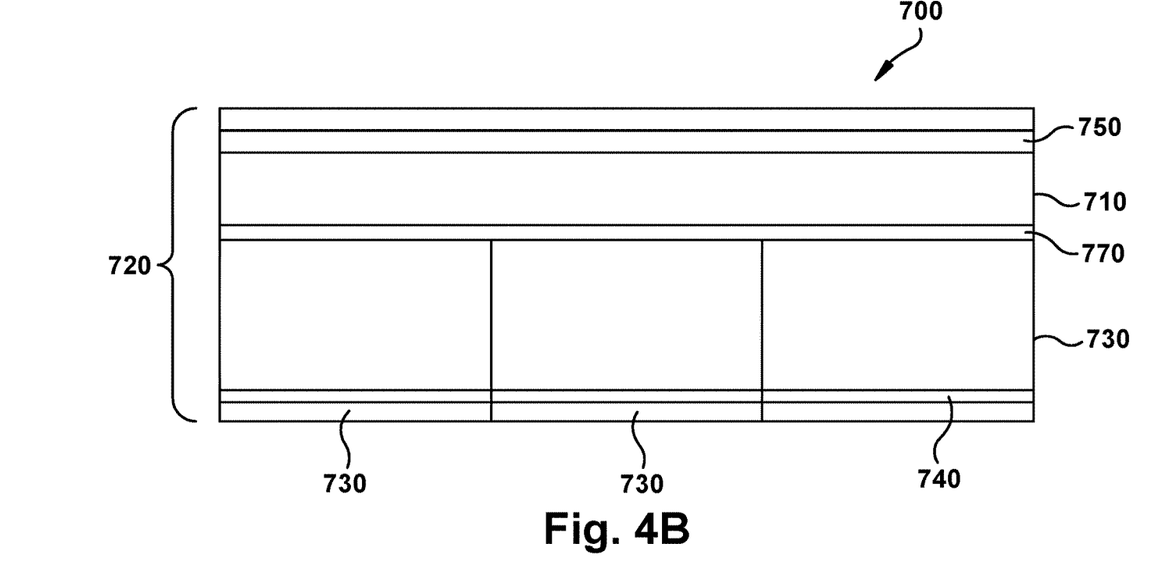
FIG. 4B is a schematic top plan view of the back side of a shingle depicting possible positioning of the sealant.
Figure 5:
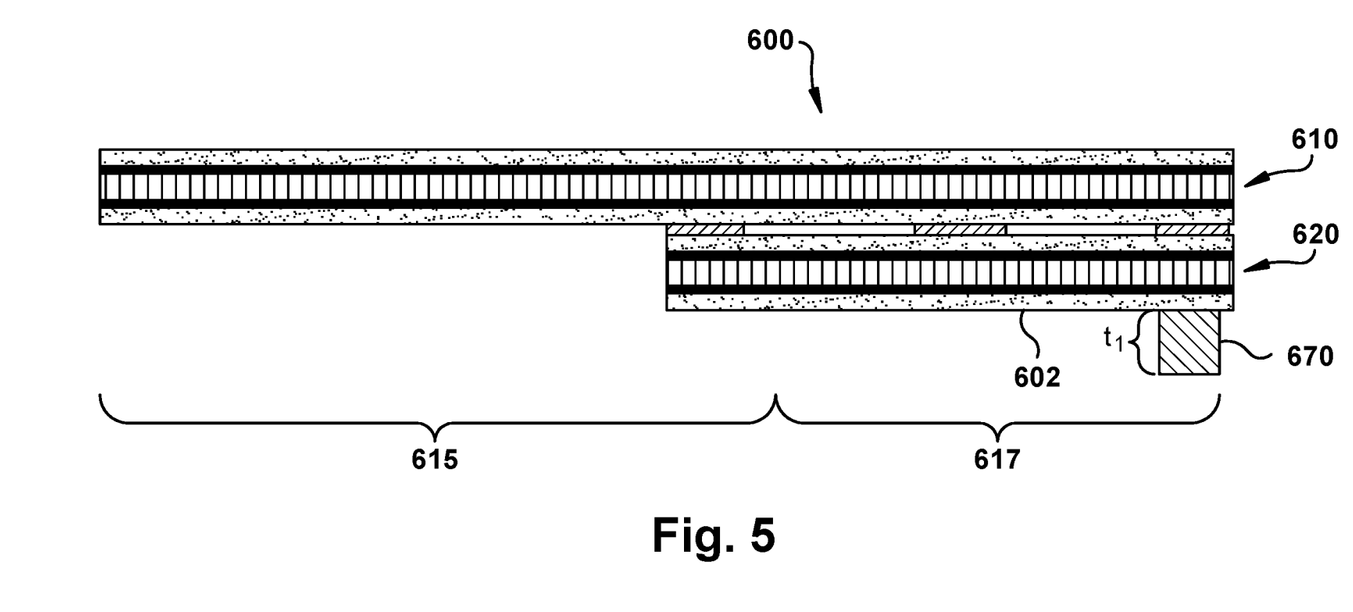
FIG. 5 is a cross-sectional side view of an exemplary embodiment of a two-layer, laminated shingle, showing the positioning of the sealant.

Exemplary embodiments of shingles with a sealant are shown in FIGS. 4A-5. In some exemplary embodiments, the sealant is applied to the upper surface of the headlap portion of the shingle. The sealant can be disposed on any portion of the headlap portion and can be disposed in multiple courses or locations of the headlap portion. In other exemplary embodiments the sealant is disposed on the lower surface of the tab portion of the shingle. The sealant can be disposed on any portion of the headlap portion and/or tab portion and can be disposed in multiple courses or locations of the headlap portion and/or tab portion. In some exemplary embodiments, the sealant is disposed on both the upper surface of the headlap portion and on the lower surface of the tab portion.

FIG. 4A shows an exemplary single layer shingle 500 having a line of sealant 570 with a fire-retardant material, in accordance with one exemplary embodiment. The shingle 500 includes a shingle sheet 510 defining a continuous rear headlap portion 515 and a slotted or discontinuous front tab portion 517 (having any suitable arrangement of optional slots or cutouts defining one or more shingle tabs). The shingle sheet 510 includes a substrate layer 520, upper and lower asphalt coating layers 530 and 540 adhered to the substrate layer, a layer of granules 550 adhered to the upper asphalt coating 530 to define an upper surface 501 of the shingle, and a layer of backdust 560 adhered to the lower asphalt coating 540 to define a lower surface 502 of the shingle 500.

Referring now to FIG. 4B, in use, the shingle 700 is placed on a roof (not shown) with the bottom side facing down towards the roof and is securely nailed to the roof by nailing or otherwise mechanically affixing the shingle 700 through the nail zone 770 having an optional reinforcement strip. A series of shingles 700 are placed on the roof in a horizontal manner across the roof to form a first course of shingles. A second course of shingles is then affixed to the roof by positioning these shingles over the first course of shingles such that the tab portion 730 of the shingles forming the second course overlaps the headlap portion 710 and nail zone 770 of the first course of shingles. The shingles forming the second course are then nailed to the roof though the nail zone 770 as described above. This process is repeated until the installer reaches the top of the roof. The sealant 740 adheres the tab portion 730 to the headlap portion 710 and/or the nail zone 770 of the shingle 700 in the course located directly below the shingle 700, thereby preventing "lift off" of the shingles 700 by high wind. The sealant 740 includes a fire-retardant material. In cases where there is an asphaltic coating to which the sealant adheres (not illustrated), the sealant also integrates into the asphaltic coating to provide a mechanical adhesion as well as an adhesion by the components forming the sealant composition.

FIG. 5 shows an exemplary laminated shingle 600 having a line of sealant 670 that includes a fire-retardant material, in accordance with an exemplary embodiment of the present application. The shingle 600 includes an overlay sheet 610 and an underlay sheet 620 defining a continuous rear headlap portion 615 and a front tab portion 617. The shingle tab portion 617 is proximate the front edge of the tabs, for adhesion to an upper surface of a headlap portion of an underlying shingle. The line of sealant 670 is disposed on the lower surface 602 of the underlay sheet 620 in the shingle tab portion 617, proximate the front edge of the tabs, for adhesion to an upper surface of a headlap portion of an underlying shingle. In some exemplary embodiments, the line of sealant may be positioned differently (e.g., on an upper surface of the headlap portion proximate the junction with the tab portion), and may be continuous or discontinuous.

The sealant of the present invention can be any type of sealant or adhesive that is able to bond two shingles together. In some exemplary embodiments, the sealant comprises asphalt as a base material. While the term asphalt will be used herein to describe the base material of the sealant, it is to be appreciated that the base material is not limited to asphalt based materials and can be any type of hydrocarbonaceous material. The asphalt may be generally present in the sealant composition in an amount from about 74.0 to about 90.5 percent by weight (wt. %), based on the total weight of the sealant composition. In some embodiments, the base asphalt may be present in the sealant composition in an amount from about 81.0 to about 88.0 wt. %, based on the total weight of the sealant composition.

In some exemplary embodiments, the asphalt of the sealant is modified with one or more co-polymers ("polymer modified asphalt"). The asphalt can be modified with any type of polymer and can contain multiple types of polymers. In some exemplary embodiments, the polymer is a linear polymer and in other exemplary embodiments, is a radial polymer. In some exemplary embodiments, the sealant comprises a mixture of linear and radial polymers. Exemplary sealant compositions are described in U.S. patent application Ser. No. 12/727,470. The sealant composition may contain other materials including, but not limited to, oils, waxes, and fillers.

In some exemplary embodiments, the specific sealant composition is chosen based on the temperature. Exemplary heat sensitive adhesives include filled asphalt, which typically has a minimum activation temperature of about 135° F., and polymer modified asphalt, which may have a minimum activation temperature between about 70° F. and about 100° F.

In colder temperatures (e.g., during winter months, in colder climates, or in shaded settings), newly installed shingles may not be exposed to temperatures sufficient to fully activate the heat sensitive adhesive for a period of several months, leaving the installed shingles weakly bonded to each other, and thus more susceptible to wind uplift, and resulting cracking, tearing, or stripping of the shingles from the roof. Alternative heat sensitive or thermally activated adhesives may be provided for colder temperature application, having a minimum activation temperature of less than about 70° F. to effect a bond between the adjacent shingles in these colder temperature settings. Non-limiting examples of heat sensitive adhesives having lower activation temperatures include modified asphalt, polymer modified asphalt, butyl, and acrylic.

In some exemplary embodiments, the roofing system comprises one or more fire-retardant materials. In some exemplary embodiments, the fire-retardant material is disposed directly within all of the sealant sections between the shingles. In some exemplary embodiments, the fire-retardant material is disposed in some of the sealant sections and is not included in other sealant sections. In other exemplary embodiments, the fire-retardant material is included in the shingle, such as blended in the asphalt coating or disposed in other selective portions of the shingle, such as described below. In other exemplary embodiments, the fire-retardant material is disposed within the sealant section and the shingle is substantially free of any fire-retardant material and/or materials that are not traditionally found in asphalt-based shingles. In other exemplary embodiments, the fire-retardant material is disposed within the sealant section and the shingle is completely free of any fire-retardant material and/or materials that are not traditionally found in asphalt-based shingles.

Applying the fire-retardant material to the sealant section (see for examples 110 in FIG. 1, 210 in FIG. 2, 310 in FIG. 3, 570 in FIG. 4A, 740, 750, and/or 770 in FIG. 4B, and 670 in FIG. 5) allows placement of the fire-retardant material where it is most useful (i.e., at the interface between an underlying and overlying shingle). This placement at the interface between overlying and underlying shingles providing the shingles, and roof on which the shingles are installed, with fire resistance while at the same time avoiding placing the fire-retardant material in areas where it is not needed.

Any of a wide variety of fire-retardant materials may be used in the sealant section. For example, the fire-retardant material may be a material that provides improved fire performance by intumescence, by releasing water during decomposition, by insulation, by char formation, or by other means. Non-limiting examples of fire-retardant materials that may be used include phosphoric acid treated asphalt, aluminum trihydroxide (ATH), magnesium hydroxide (MDH), colemanite, hydromagnesite, boehmite, borax (tincal), ulexite, huntite, ammonium polyphosphate, feric acid treated asphalt, kaolin clay, brucite, gibbsite, bisphenol-A bis(diphenyl phosphate) sold under the tradename Fyroflex® RDP by ICL Industrial, dragonite-XR, silapore, nano clays, expandable graphite, chlorinated fire-retardant compounds, fumed silica, and other suitable materials. Other suitable fire-retardant materials include various borates, such as, for example, sodium borate, sodium tetraborate, disodium tetraborate, and zinc borate, as well as boric acid, and the salts thereof. The fire-retardant material can also comprise mixtures and blends of any number of the individual fire-retardant materials discussed herein.

The amount of fire-retardant material included in the sealant section may vary. In some exemplary embodiments, the fire-retardant material can be included in an amount from about 0.1 to about 20.0 wt. %, or from about 0.25 to about 10.0 wt. %, or from about 1.0 to about 7.0 wt. %, or from about 2.0 to about 5.0 wt. %, based on the weight of only the sealant material.

While a wide variety of fire-retardant materials are discussed herein as being useable in the sealant section, the use of Borax as the fire-retardant material is particularly advantageous. It has been surprisingly discovered that Borax was able to be used at lower levels, for example those levels discussed herein, such that it was found to be suitable to include in the sealant section. Particularly, the addition of Borax did not require such high contents of the fire-retardant material as to cause the sealant section to cake into a powder or grit. Additionally, this reduces production costs as less of the fire-retardant material is needed in each product. This also improves the adhesive sections primary function as a bonding material.

In some exemplary embodiments, the asphalt-based shingle with fire-retardant material in the sealant section passes the ASTM E108 (UL790) burning brand fire test ("ASTM E108"). The ASTM E108 standard includes three classifications regarding varying severity of testing parameters and criteria: Class A roof coverings are effective against severe fire test exposures, Class B roof coverings are effective against moderate fire test exposures, while Class C roof coverings are effective only against light fire test exposures. In some exemplary embodiments, the asphalt-based shingle with fire-retardant material in the sealant section passes the ASTM E108 Class C standard and in other exemplary embodiments passes the ASTM E108 Class B standard. In some embodiments, the asphalt-based shingle with fire-retardant material in the section passes the ASTM E108 Class A standard.

In a second aspect of the present invention, a laminated shingle is provided. The laminated shingle may have a first asphalt-coated substrate and a second asphalt-coated substrate. The first and second asphalt-coated substrates can be held together by an adhesive material. This adhesive material can contain various fire-retardant materials.

The laminated shingle may have a wide variety of configurations. The laminated shingle may have a first asphalt-coated substrate and a second asphalt-coated substrate. The substrate of the shingle can be any type known for use in reinforcing asphalt-based roofing materials, such as a web, scrim, or felt of fibrous materials such as mineral fibers, cellulose fibers, rag fibers, mixtures of mineral and synthetic fibers, or the like. Combinations of materials can also be used in the substrate. In certain embodiments, the substrate is a nonwoven web of glass fibers. In other exemplary embodiments, the substrate is a mixture of glass fibers and mineral fibers. In other exemplary embodiments, the substrate is a mixture of glass fibers and synthetic fibers. In still other exemplary embodiments, the substrate is made of polymeric fibers. The substrate may be any conventional substrate used in asphalt shingles, roll roofing, low-slope membranes, and the like.

The asphalt coatings are generally formed from a layer of hot, melted asphalt applied to the substrate. While the term asphalt coating is used herein, it is to be appreciated that the coating can be any coating generally used in the roofing industry, such as various hydrocarbaceous materials. The asphalt coating can be applied to the substrate in any suitable manner. For example, the substrate can be submerged in the asphalt or the asphalt can be rolled on, sprayed on, or applied to the substrate by other means. The asphalt coating may also be any type of bituminous material suitable for use on a roofing material, such as asphalts, tars, pitches, or mixtures thereof. The asphalt can be either a manufactured asphalt produced by refining petroleum or a naturally occurring asphalt. The asphalt can also be oxidized or non-oxidized, blown or un-blown. The asphalt can also be made from various reclaimed or recycled roofing materials. The asphalt coating can include various additives and/or modifiers, such as inorganic fillers or mineral stabilizers, organic materials such as polymers, recycled streams, or ground tire rubber. In certain embodiments, the asphalt-coatings comprise asphalt and inorganic fillers or mineral stabilizers. The asphalt coatings may be any conventional asphalt used in shingles, and can be applied in any conventional manner and in any conventional amount or thickness.

Any number of asphalt-coatings can be applied to the laminated shingle. While exemplary embodiments described herein used two asphalt-coated substrates, it is to be appreciated that the laminated shingle can have more asphalt-coated substrates. In some embodiments, the laminated shingle is made from three asphalt-coated substrates and in other embodiments, is made from four or five asphalt-coated substrates. More asphalt-coated substrates can be used based on the specific needs and desired properties of the laminated shingles.

Figure 6:
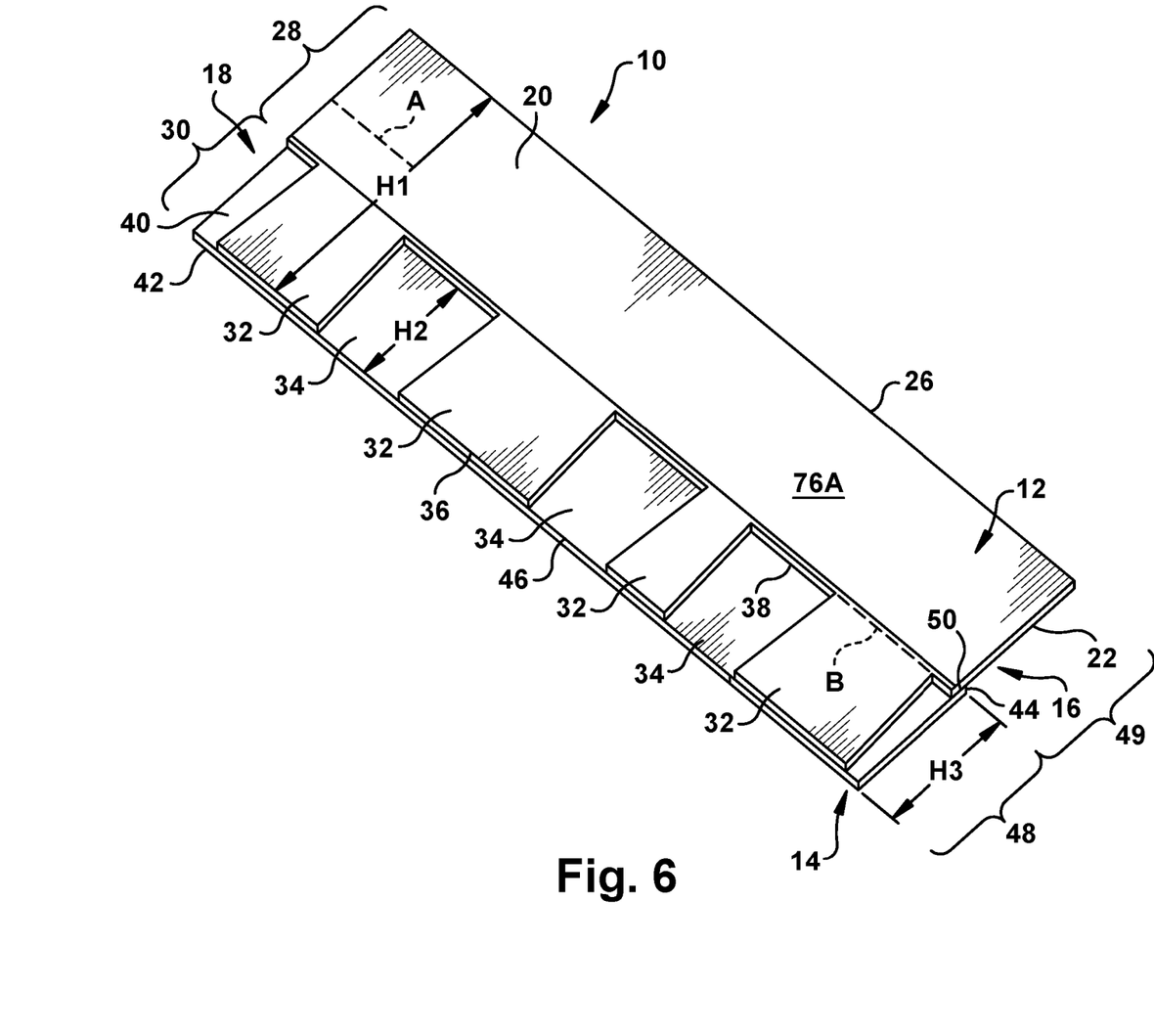
FIG. 6 is a perspective view of an exemplary laminated shingle.

FIG. 6 illustrates an exemplary embodiment of an asphalt-based laminated roofing shingle 10. The laminated shingle 10 may be configured in a variety of ways. For example, the shape, the size, the types of materials used, the number of layers, and other properties may vary. Any configuration that is suitable for use as a roofing shingle may be used. The exemplary laminate shingle 10 includes an overlay sheet 12 disposed on and attached to an underlay sheet 14. In some exemplary embodiments, however, the shingle 10 may be configured as a single sheet, such as a three-tab shingle, or a multilayered shingle having more than two sheets. The shingle 10 includes a first side 16, a second side 18 spaced apart from the first side and a longitudinal axis A. The overlay sheet 12 is generally planar and has a top face 20, a bottom face 22 opposite and generally parallel to the top face, and a rear edge 26 extending from the first side 16 to the second side 18 of the shingle 10.

The overlay sheet 12 includes a headlap portion 28 and a tab portion 30 and has a first height H1. The tab portion 30 defines a series of tabs 32 and cutouts 34 between adjacent tabs 32. In the illustrated embodiment, the tab portion 30 includes four tabs 32 varying in shape and spacing from each other. In some exemplary embodiments, however, any suitable number of tabs may be provided and the tabs may be equidistant from each other and shaped substantially the same. Each tab 32 has a front edge 36 and each cutout 34 has an upper edge 38 and a second height H2. In the illustrated embodiment, the cutouts 34 are shown as having the same second height H2. In other embodiments, however, each cutout 34 has different heights. In FIG. 6, a line B is collinear with the upper edge 38 of the cutouts 34 and defines an upper limit of the cutouts on the overlay sheet 12. In a shingle where the cutouts 34 have different second heights H2, the line B may be collinear with an upper edge 38 of the cutout having the largest second height.

The underlay sheet 14 is generally planar and has a top face 40, a bottom face 42 opposite and generally parallel to the top face, a rear edge 44 extending from the first side 16 to the second side 18 and a front edge 46 opposite the rear edge and extending from the first side 16 to the second side 18. The underlay sheet 14 has a third height H3.

The overlay sheet 12 is disposed on and adhered to the underlay sheet 14 thereby defining both a two-layer portion 48 of the laminated shingle 10 and a single-layer portion 50 of the laminated shingle. As illustrated in FIG. 6, the front edge 36 of each tab 32 is generally aligned with the front edge 46 of the underlay sheet 14. The overlapping area 52 of the overlay sheet 12 and the underlay sheet 14 between the rear edge 44 of the underlay sheet 14 and the line B is referred to as a common bond area, which extends longitudinally from the first side 16 to the second side 18. The overlay sheet 12 may be attached to the underlay sheet 14 by any suitable manner, such as for example, by an adhesive. The placement of adhesive between the underlay sheet 14 and overlay sheet 12 is not particularly limited and can be placed at any location suitable for adhering the sheets together. In the exemplary embodiments described herein, the adhesive will be referred to as being disposed on the underlay sheet 14, such that when the overlay sheet 12 and underlay sheet 14 are combined, the adhesive binds the sheets. However, it is to be appreciated that the adhesive could also be applied to the bottom portion of the overlay sheet 12, which would provide the same intended result of adhering the two layers when combined.

Figure 7:
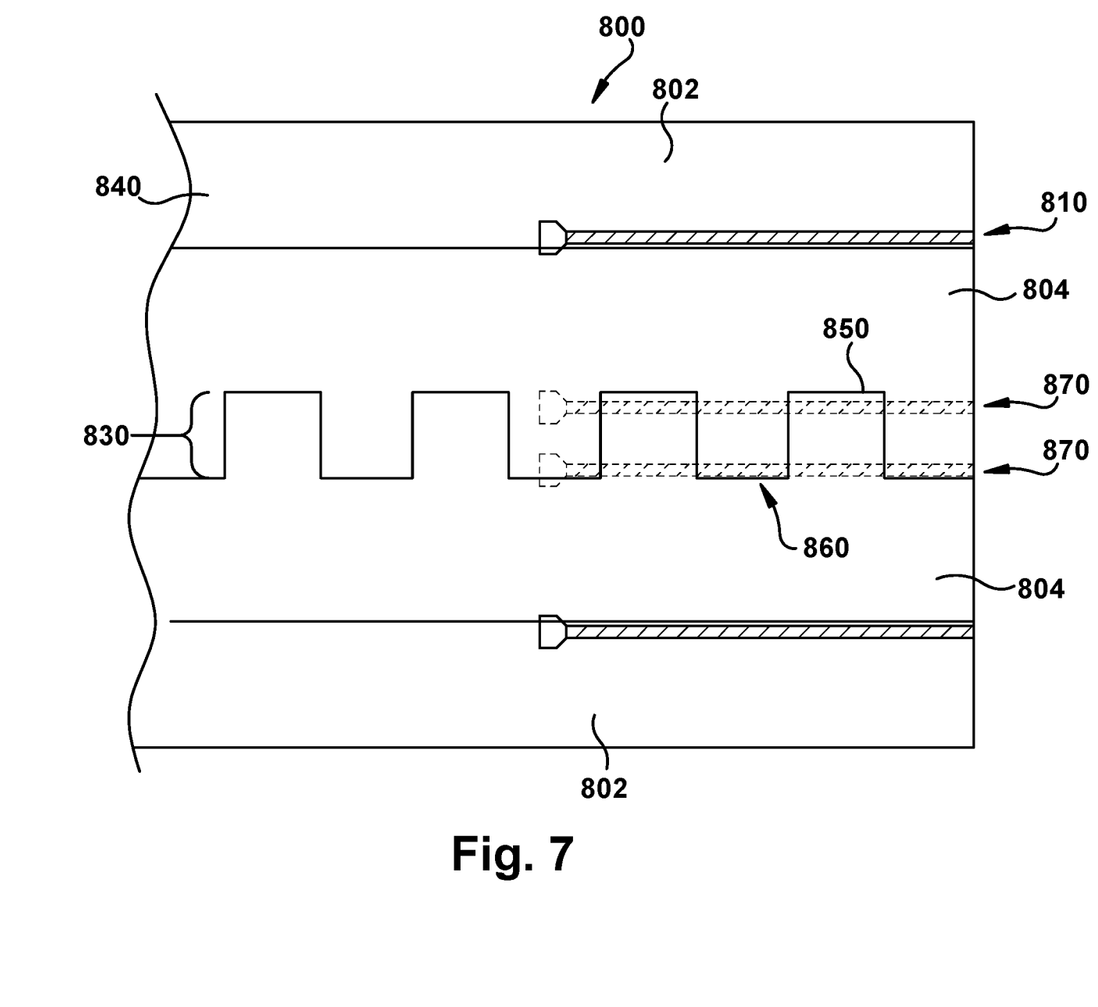
FIG. 7 is an exemplary strip with multiple lines of adhesive where the strip may be cut and assembled into laminated shingles.
Figure 8:
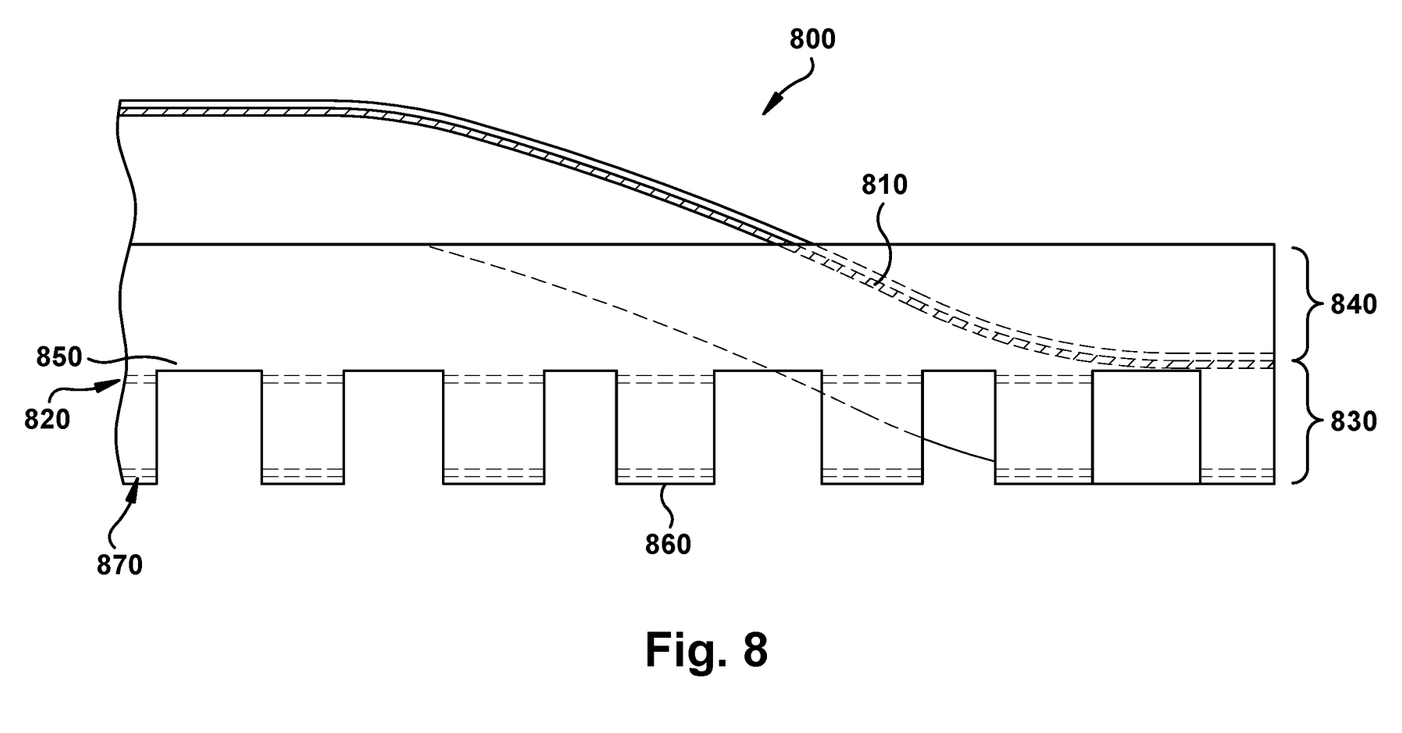
FIG. 8 is a view the strip with multiple lines of adhesive of FIG. 7 being cut assembled to form a strip of a laminated shingle material.

FIGS. 7 and 8 show an exemplary embodiments of a strip of asphalt and granule coated material 800 being cut into underlay 802 and overlay 804 portions of the shingle with adhesives lines 810 and/or 870. The adhesive lives 810 and/or 870 are provided at a variety of locations on the strip 800. The adhesive lines 810 and/or 870 can have a wide variety of different configurations and any number of lines can be included.

In the exemplary embodiments illustrated by FIGS. 7 and 8, the adhesive line 870 extends along substantially an entire width and is close to an edge 860 of the tab portion 830. The illustrated adhesive lines 810 and/or 870 extend in the machine direction (i.e. the direction in which the base layer travels through a production line as it is made, which is also the direction of the width of the shingle). The adhesive line 870 can also be located on any portion of the tab portion 830. In some exemplary embodiments, the adhesive line 870 is disposed in a line on the bottom surface of the tab portion 830 and is close to the edge 850 between the headlap portion 840 and tab portion 830. In various other exemplary embodiments (not shown), the adhesive can be placed at any point between the edges 850 and 860, such as half way between the edges. In some exemplary embodiments, multiple lines of adhesive are disposed on the tab portion. Multiple lines of the adhesive on the tab portions, such as 2 lines, or 3 lines, or 4 lines, or even more are within the purview of the present invention.

As shown in FIGS. 7 and 8, the adhesive line 810 can also be placed on the underlay sheet 802. In some exemplary embodiments, the adhesive line is on the top surface of the underlay sheet 802. For examples, the adhesive line 810 can be positioned to bond with the bottom surface of the headlap portion 840 of the overlay sheet 804.

As shown in FIGS. 7 and 8, the adhesive lines 810 and/or 870 are parallel to the machine direction. It should be appreciated, however, that the adhesive lines can also be perpendicular to the machine direction. Multiples lines of adhesive can be applied in this manner. In some exemplary embodiments, the adhesive can be applied both in lines parallel to the machine direction and lines perpendicular to the machine direction.

In the illustrated embodiments, the adhesive lines 810 and/or 870 are a continuous bead/line. In other embodiments, the adhesive lines 810 and/or 870 may be dashed. In other embodiments, the adhesive can be dots of adhesive. In still other exemplary embodiments, the adhesive can be a sheet that substantially or completely covers the entire underlay portion 800 that is below the overlay portion.

In some exemplary embodiments, the laminated shingle comprises one or more fire-retardant materials. In some exemplary embodiments, the fire-retardant material is disposed directly within all of the adhesive section between the first and second asphalt-coated substrates. In some exemplary embodiments, the fire-retardant material is disposed in some of the adhesive sections and is not included in other adhesive sections. In other exemplary embodiments, the fire-retardant material is included in the shingle, such as blended in the asphalt coating or disposed in other selective portions of the shingle. In other exemplary embodiments, the fire-retardant material is disposed within the adhesive section and the rest of the shingle is substantially free of any fire-retardant material and/or materials that are not traditionally found in asphalt-based shingles. In other exemplary embodiments, the fire-retardant material is disposed within the adhesive section and the rest of the shingle is completely free of any fire-retardant material and/or materials that are not traditionally found in asphalt-based shingles.

Applying the fire-retardant material in the adhesive section allows placement of the fire-retardant material where it is most useful (i.e., in the bonded areas of a laminated shingle). By providing the fire-retardant material in the bonded area, the shingle, and roof on which the shingle is installed, is provided with fire resistance.

Any of a wide variety of fire-retardant materials may be used in the adhesive section. For example, the fire-retardant material may be a material that provides improved fire performance by intumescence, by releasing water during decomposition, by insulation, by char formation, or by other means. Non-limiting examples of fire-retardant materials that may be used include phosphoric acid treated asphalt, aluminum trihydroxide (ATH), magnesium hydroxide (MDH), colemanite, hydromagnesite, boehmite, borax (tincal), ulexite, huntite, ammonium polyphosphate, feric acid treated asphalt, kaolin clay, brucite, gibbsite, bisphenol-A bis(diphenyl phosphate) sold under the tradename Fyroflex® RDP by ICL Industrial, dragonite-XR, silapore, nano clays, expandable graphite, chlorinated fire-retardant compounds, fumed silica, and other suitable materials. Other suitable fire-retardant materials include various borates, such as, for example, sodium borate, sodium tetraborate, disodium tetraborate, and zinc borate, as well as boric acid, and the salts thereof. The fire-retardant material can also comprise mixtures and blends of any number of the individual fire-retardant materials discussed herein.

The amount of fire-retardant material included in the adhesive section may vary. In some exemplary embodiments, the fire-retardant material can be included in an amount from about 0.1 to about 20.0 wt. %, or from about 0.25 to about 10.0 wt. %, or from about 1.0 to about 7.0 wt. %, or from about 2.0 to about 5.0 wt. %, based on the weight of only the adhesive material.

While a wide variety of fire-retardant materials are discussed herein as being useable in the adhesive section, the use of Borax as the fire-retardant material is particularly advantageous. It has been surprisingly discovered that Borax was able to be used at lower levels, for example those levels discussed herein, such that it was found to be suitable to include in the adhesive section. Particularly, the addition of Borax did not require such high contents of the fire-retardant material as to cause the adhesive section to cake into a powder or grit. Additionally, this reduces production costs as less of the fire-retardant material is needed in each product. This also improves the adhesive sections primary function as a bonding material.

In some exemplary embodiments, the asphalt-based shingle with fire-retardant material in the adhesive section passes the ASTM E108 (UL790) burning brand fire test ("ASTM E108"). The ASTM E108 standard includes three classifications regarding varying severity of testing parameters and criteria: Class A roof coverings are effective against severe fire test exposures, Class B roof coverings are effective against moderate fire test exposures, while Class C roof coverings are effective only against light fire test exposures. In some exemplary embodiments, the asphalt-based shingle with fire-retardant material in the adhesive section passes the ASTM E108 Class C standard and in other exemplary embodiments passes the ASTM E108 Class B standard. In some embodiments, the asphalt-based shingle with fire-retardant material in the adhesive section passes the ASTM E108 Class A standard.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:
1. A roofing system comprising:
a roof deck;
two or more asphalt-coated substrates on the roof deck where a first of the asphalt-coated substrates overlies at least a portion of a second of the asphalt-coated substrates;
a sealant material, located along the overlying portion between the first of the asphalt-coated substrates and the second of the asphalt-coated substrates, that bonds the first asphalt coated substrate to the second asphalt coated substrate,
wherein the sealant material comprises a hydrocarbonaceous material and one or more fire-retardant materials, and the fire-retardants material are present from about 0.1 wt. % to about 20.0 wt. % based on the weight of only the sealant material.

2. The roofing system of claim 1, wherein fire-retardant materials are selected from one or more of the group consisting of aluminum trihydroxide, magnesium hydroxide, colemanite, hydromagnesite, boehmite, borax (tincal), ulexite, huntite, ammonium polyphosphate, feric acid treated asphalt, kaolin clay, brucite, gibbsite, bisphenol-A bis(diphenyl phosphate), dragonite-XR, silapore, nano clays, expandable graphite, chlorinated fire-retardant compounds, fumed silica, borates, and mixtures thereof.

3. The roofing system of claim 1, wherein the first of the asphalt-coated substrates and the second of the asphalt-coated substrates are each a shingle.

4. The roofing system of claim 1, wherein the fire-retardant materials comprises borax.

5. The roofing system of claim 1, wherein the fire-retardant materials are present from about 2.0 wt. % to about 5.0 wt. %, based on the weight of the sealant material.

6. The roofing system of claim 1, wherein the asphalt-coated substrates are substantially free of fire-retardant materials.

7. The roofing system of claim 1, wherein the asphalt-coated substrates are completely free of fire-retardant materials.

8. A laminated roofing shingle, comprising:
a first asphalt-coated substrate; and
a second asphalt-coated substrate laminated on top of the first asphalt-coated substrate such that at least a portion of the second asphalt-coated substrate overlaps at least a portion of the first asphalt-coated substrate,
wherein an adhesive material is located along the overlying portion between the first asphalt-coated substrate and the second asphalt-coated substrate and adheres the first asphalt-coated substrate to the second asphalt-coated substrate, and
wherein the adhesive material comprises a hydrocarbonaceous material and one or more fire retardant materials, and the fire-retardants material are present from about 0.1 wt. % to about 20.0 wt. % based on the weight of only the adhesive material.

9. The laminated shingle of claim 8, wherein the first asphalt-coated substrate is an underlay sheet.

10. The laminated shingle of claim 8, wherein the second asphalt-coated substrate is an overlay sheet.

11. The laminated shingle of claim 10, wherein the overlay sheet has a headlap portion and a tab portion, the tab portion including a series of tabs and cutouts extending along a longitudinal length of the overlay sheet.

12. The laminated shingle of claim 8, wherein the first asphalt-coated substrate and the second asphalt-coated substrate are substantially free of the fire-retardant materials.

13. The laminated shingle of claim 8, wherein the first asphalt-coated substrate and the second asphalt-coated substrate are completely free of the fire-retardant materials.

14. The laminated shingle of claim 8, wherein the fire-retardant materials are selected from i-s one or more the group consisting of aluminum trihydroxide, magnesium hydroxide, colemanite, hydromagnesite, boehmite, borax (tincal), ulexite, huntite, ammonium polyphosphate, feric acid treated asphalt, kaolin clay, brucite, gibbsite, bisphenol-A bis(diphenyl phosphate), dragonite-XR, silapore, nano clays, expandable graphite, chlorinated fire-retardant compounds, fumed silica, borates, and mixtures thereof.

15. The laminated shingle of claim 8, wherein the fire-retardant materials comprises borax.

16. The laminated shingle of claim 8, wherein the fire-retardant materials are present from about 0.1 to about 20.0 wt. %, based on the weight of the adhesive material.

17. The laminated shingle of claim 8, wherein the fire-retardant materials are present from about 2.0 to about 5.0 wt. %, based on the weight of the adhesive material.

18. A roofing system comprising:
a roof deck;
two or more laminated shingles on the roof deck, where at least a portion of a first of the laminated shingles overlies at least a portion of a second of the laminated shingles, the laminated shingles each including a first rectangular-shaped asphalt-coated substrate, and a second asphalt-coated substrate laminated on top of the first asphalt-coated substrate such that at least a portion of the second asphalt-coated substrate overlaps at least a portion of the first asphalt-coated substrate, the second asphalt-coated substrate including a headlap portion and a tab portion;
a sealant material, located along the overlying portion between the first of the laminated shingles and the second of the laminated shingles, that bonds the first of the laminated shingles to the second of the laminated shingles,
wherein the sealant material comprises a hydrocarbonaceous material and one or more fire-retardant materials and the fire-retardants material are present from about 0.1 wt. % to about 20.0 wt. % based on the weight of only the sealant material.

* * * * *